United States Patent
Ryu

(10) Patent No.: US 8,373,715 B1
(45) Date of Patent: Feb. 12, 2013

(54) PROJECTION PAINTING WITH ARBITRARY PAINT SURFACES

(75) Inventor: David Ryu, San Francisco, CA (US)

(73) Assignee: Pixar, Emeryville, CA (US)

( * ) Notice: Subject to any disclaimer, the term of this patent is extended or adjusted under 35 U.S.C. 154(b) by 1299 days.

(21) Appl. No.: 12/045,381

(22) Filed: Mar. 10, 2008

Related U.S. Application Data

(60) Provisional application No. 60/894,038, filed on Mar. 9, 2007.

(51) Int. Cl.
*G09G 5/00* (2006.01)

(52) U.S. Cl. ........ 345/581; 345/418; 345/419; 345/420; 345/426; 345/582; 345/583; 345/584; 345/585; 345/586; 345/606; 345/611; 345/619

(58) Field of Classification Search ............ None
See application file for complete search history.

(56) References Cited

U.S. PATENT DOCUMENTS

| | | | |
|---|---|---|---|
| 2003/0048277 A1* | 3/2003 | Maillot et al. | 345/582 |
| 2005/0062739 A1* | 3/2005 | Balmelli et al. | 345/426 |

OTHER PUBLICATIONS

Image-Based Object Editing, Author: Rushmeier et al., pp. 1-8, date: 2003, source:http://citeseerx.ist.psu.edu/viewdoc/summary?doi=10.1.1.88.1162.*

* cited by examiner

*Primary Examiner* — Kee M Tung
*Assistant Examiner* — Jwalant Amin
(74) *Attorney, Agent, or Firm* — Patterson & Sheridan, LLP

(57) ABSTRACT

Object previews for projection painting operations using arbitrary paint surfaces are provided. The object preview is rendered from the view of the arbitrary projection paint surface. The object preview is provided to the user, who then may define projection paint attribute values by painting over the object preview. The projection paint attribute values are mapped back on to the projection paint surface and one or more images of the object geometry are rendered using the projection paint attribute values. Object previews are rendered by defining a camera view and a proxy surface. A mapping from the proxy surface to a projection surface is defined and associates proxy surface points with projection paint surface points. Rays generated using a projection operation are defined and a renderer uses these rays to determine attribute values for their associated points on the proxy surface to define an object preview image.

16 Claims, 5 Drawing Sheets

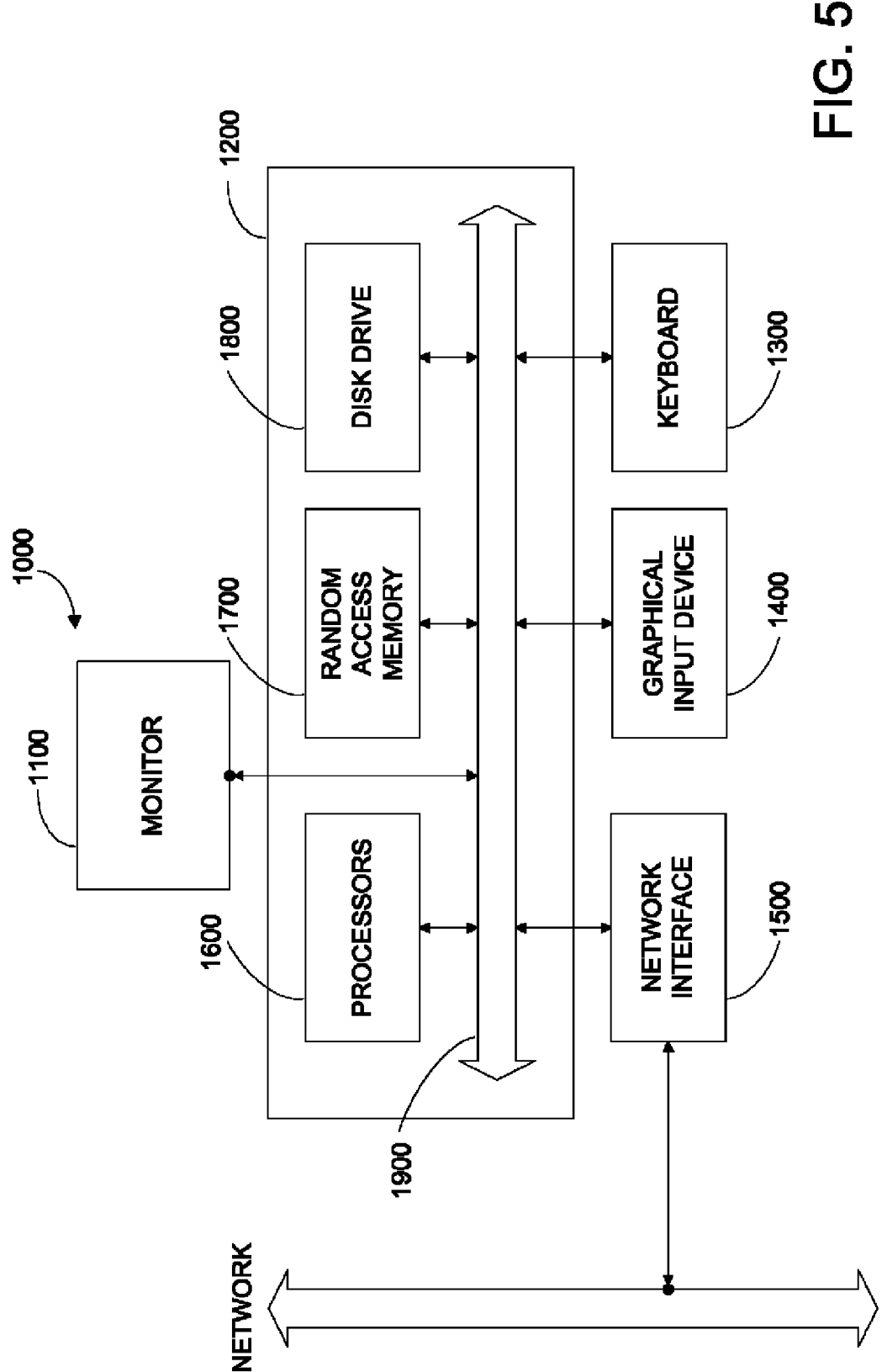

PROJECTION PAINTING WITH ARBITRARY PAINT SURFACES

CROSS-REFERENCE TO RELATED APPLICATIONS

This application claims priority to U.S. Provisional Patent Application No. 60/894,038, filed Mar. 9, 2007, which is incorporated by reference herein for all purposes.

BACKGROUND OF THE INVENTION

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Attribute functions can define the values of attributes of surfaces in three-dimensional space. Attribute functions can be evaluated at any point to provide corresponding attribute values at that point. Attributes can include optical properties of a surface, such as color, transparency, reflectivity, and refractivity. Attributes can also include visibility or occlusion information; artistically or procedurally generated texture data in one, two, three, or more dimensions; noise functions in one, two, three, or more dimensions, which can be used to procedurally generate or modify other attributes; shadow generation information; forces or attributes used for physics, cloth, fluid, or other types of simulations; animation data, which can be used to specify motion of entities associated with a surface point, such as fur or hair; modeling parameters, such as the density of procedurally generated grass applied to a model of a landscape; illumination information, which specifies the amount and direction of light on the surface point from other portions of the scene; and rendering information, such as ray tracing path information or radiosity rendering information.

Texture mapping is one approach for assigning attribute values to surfaces. Texture mapping "wraps" or applies a one, two, three, or more dimensional data set, such as an image, around the surface of an object. Texture mapping is widely used to give computer models a more realistic-looking appearance. One problem with texture mapping is it is often difficult to wrap or apply a flat, two-dimensional image to a three-dimensional surface. Many three-dimensional surfaces are not developable, which means they cannot be unrolled and flattened onto a plane without tearing, wrinkling, stretching, or otherwise distorting. It is difficult for an artist creating a two dimensional image to be texture-mapped onto a non-developable surface to compensate for this to create a continuous and distortion-free texture on the surface.

Additionally, texture mapping often relies on the surface having its own global coordinate system, such as a UV coordinate system in the plane of the surface. However, many types of complex surfaces do not have a global surface coordinate system. For these surfaces, there is no coordinate system within or on the surface itself that can define the position of any surface point as a set of numerical values. Examples of these types of surfaces include subdivision surfaces, implicit surfaces, and fractal surfaces.

Because of the limitations of texture mapping, projection paint techniques are used to apply attributes instead of texture mapping. Projection paint initially defines one or more different camera views of an object. Artists paint images of the desired attributes in the camera views. These painted images and their associated camera view information are then stored. During rendering from any viewpoint, the images of the painted attributes are projected from their associated camera views on to the objects to determine the attribute values. Painted images can be blended, feathered, or otherwise processed using image processing techniques to prevent visible seams and gaps in the attribute values. Depth maps may be used to resolve ambiguities when projecting painted images on non-convex surfaces.

Although projection paint techniques give artists more flexibility in assigning attribute values, they still have to compensate for some distortion. Distortion will occur when the curvature of the surface differs from that of the plane used to paint attribute values. If the surface curves towards or away from the plane of the paint surface, the attribute values may appear distorted when the surface is viewed from a different angle, due to the way that the projection function transfers attribute values from the painted image back to the surface.

It is therefore desirable for improved projection paint systems and methods to give artists more control over the application of attribute values to surfaces. It is also desirable for systems and methods to help minimize distortion in projection paint due to surface curvature and edges.

BRIEF SUMMARY OF THE INVENTION

An embodiment of the invention provides object previews for projection painting operations using arbitrary paint surfaces. The object preview is rendered from the view of the arbitrary projection paint surface. The object preview is provided to the user, who then may define projection paint attribute values by painting over the object preview. The projection paint attribute values are mapped back on to the projection paint surface and one or more images of the object geometry are rendered using the projection paint attribute values.

Projection paint attributes may be projected from the paint surface on to surfaces of objects as well as on to objects without a well-defined surface, such particle systems, volumetric entities, or the volume interior of three-dimensional geometry. Attribute values can be blended, feathered, bled, or otherwise processed using image processing techniques to prevent visible seams and gaps in the attribute values. Depth maps may be used to resolve ambiguities when projecting painted images on non-convex surfaces.

In an embodiment, object previews are rendered by defining a camera view and an associated proxy surface. A mapping from the proxy surface to a projection surface associated with the object geometry data is also defined. Points on the proxy surface are associated with points on the projection paint surface using the mapping. For the points on the projection paint surface, rays are generated using a projection operation defined for the projection paint surface. A renderer uses these rays and the object geometry data to determine attribute values for at least some of the rays. These ray attribute values are then assigned to their associated points on the proxy surface to define an object preview image.

In an embodiment, the projection paint surface can have any arbitrary topology, including analytic and non-analytic surfaces. In an embodiment, the projection operation of the projection paint surface may be defined analytically, using numerical analysis techniques, or manually. The projection operation may result in a well-pelted object preview image.

BRIEF DESCRIPTION OF THE DRAWINGS

The invention will be described with reference to the drawings, in which:

FIG. 5 illustrates a computer system suitable for implementing an embodiment of the invention.

DETAILED DESCRIPTION OF THE INVENTION

In projection paint systems, paint images are created by viewing the model or surface from one or more camera views. In prior projection paint systems, these camera views are limited to standard orthographic or perspective camera views. In both of these cases, the paint image is painted on top of a projection of the model or surface on to a plane. An embodiment of the invention allows projection paint images to be created by painting on top of a projection of a model or surface on to an arbitrary surface, such as cylinder, sphere, or torus.

Figure 1:
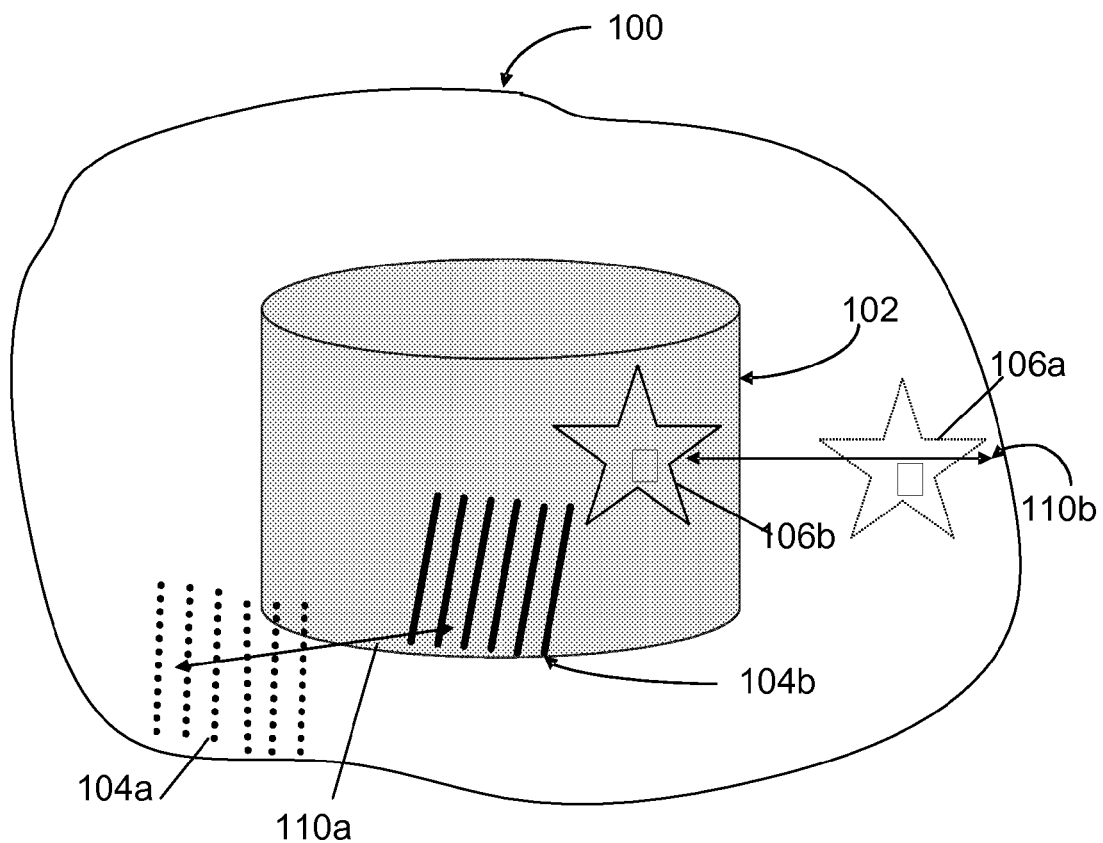
FIG. 1 illustrates an example projection paint surface and associated object geometry data according to an embodiment of the invention.

In one embodiment, as illustrated in FIG. 1, a paint surface 100 is disposed around an object 102. In this illustration, the paint surface 100 may be any arbitrary surface that wholly or partially surrounds the object, such as a cylinder, sphere, torus, or any other arbitrary surface topology. The paint surface 100 can be any arbitrary surface that has a defined projection operation. The paint surface 100 may include surfaces with constant or non-constant curvatures, such as paraboloids, hyperboloids, or ellipsoids. Embodiments of paint surface 100 can be developable or non-developable surfaces. Embodiments of paint surface 100 can be analytic or non-analytic surfaces. In further embodiments, the paint surface 100 can be a proxy object, or approximation of the topology of the object 102.

Figure 2:
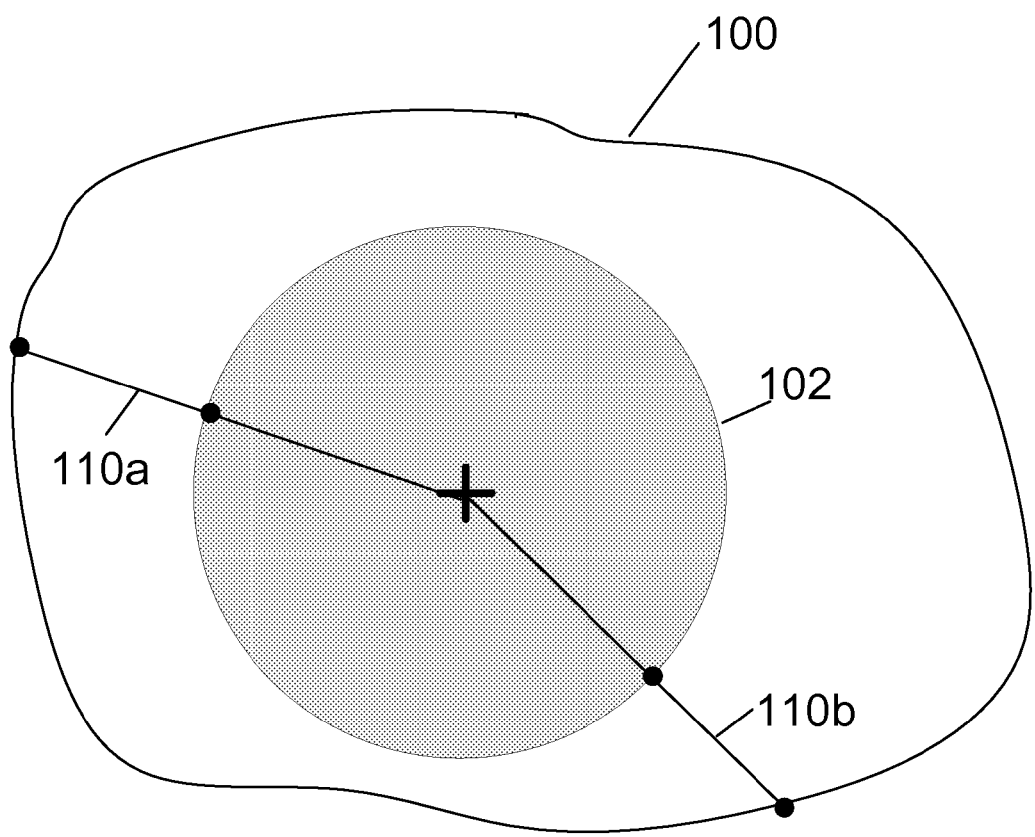
FIG. 2 illustrates an example application of projection paint attributes on to object geometry data according to an embodiment of the invention.

In an embodiment, as illustrated in FIG. 1 and FIG. 2, the object 102 can be projected on to the paint surface 100. This projection can be defined by the topology of the paint surface 100 as well as the projection operation defined for the paint surface 100. For example, the projection operation for a cylindrical paint surface may project points from the object to the paint surface 102 along a ray aligned with the center axis of the cylinder. For a spherical paint surface, the projection operation may align rays with the center point of the spherical paint surface. Embodiments of the invention can define the projection of the object 102 on to a paint surface 100 by projecting points of the object along rays defined by the projection operation of the paint surface 100. The projection can be directed inward or outwards from the paint surface 100.

Figure 3:
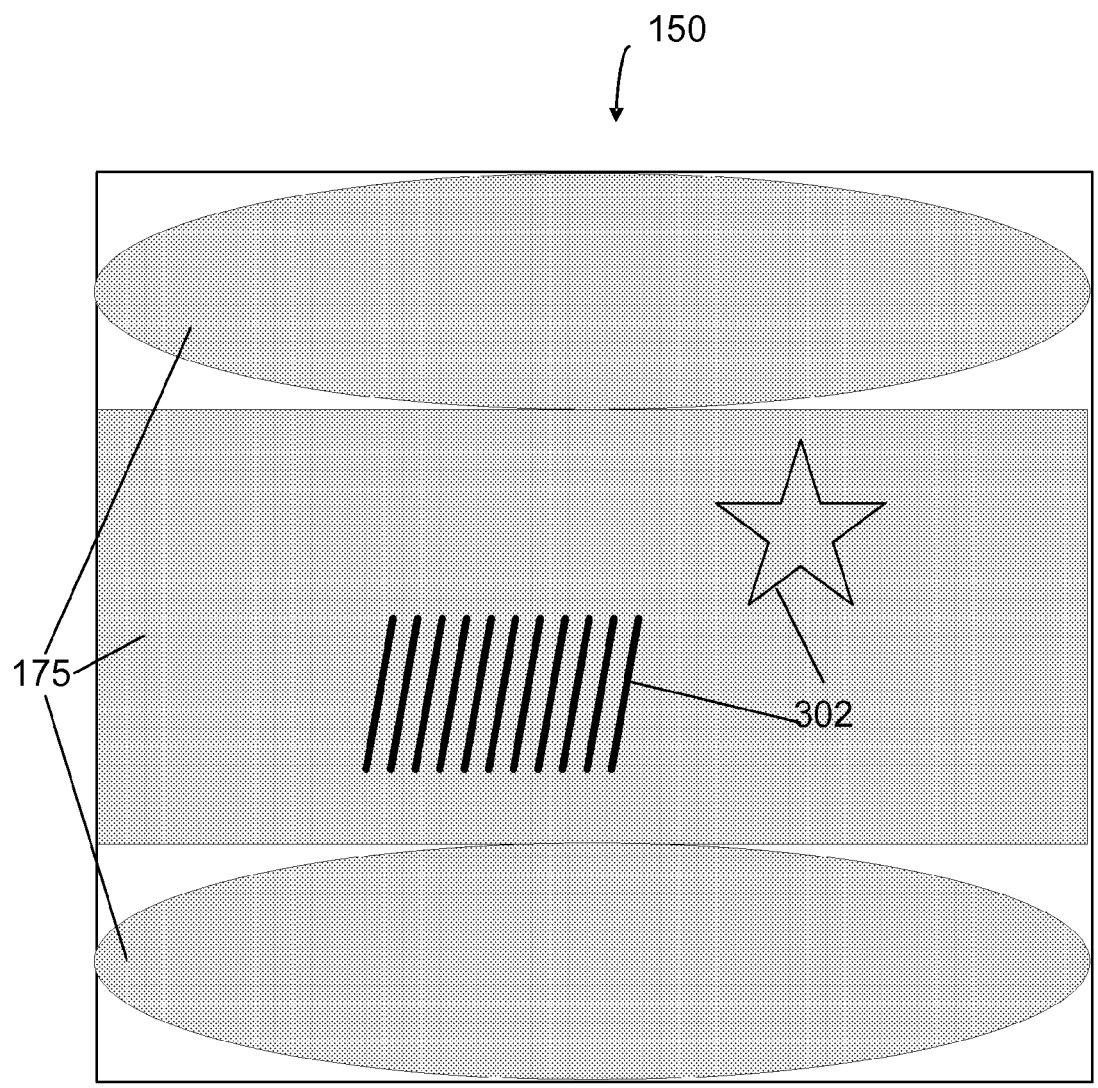
FIG. 3 illustrates a planar projection paint surface and object preview image according to an embodiment of the invention.

For example, as shown in FIG. 1 one or more rays 110 are used to project points of the object 102 on the paint surface 100. This process allows the object 102 to be essentially redrawn as a flat or planar paint surface 150 representation as illustrated in FIG. 3. The transformation of paint surface 100 into a planar paint surface 150 can be done using any technique known in the art for mapping three-dimensional surfaces to flat planes. This transformation may be stored for later use in transforming attribute values from its planar representation 150 back on to the associated paint surface 100 and then on to the object 102.

FIG. 3 illustrates a planar paint surface 150 corresponding with the paint surface 100. The planar paint surface 150 corresponds with an unrolled or flattened version of the paint surface 100. In this example, the planar paint surface 150 includes a rendered view 175 of the object 102 as projected on to the paint surface 100. A user may then paint attribute values 302 on the planar paint surface 150 using any suitable paint or image editing or processing application. The rendered view 175 of the object 102 in the planar paint surface 150 serves as a visual reference for aligning painted attribute values 302 with features of the object 102. The set of painted attribute values 302 is referred to as a painted image.

The painted image can be stored along with information defining the paint surface 100 and its projection operation. This information is used to project attribute values from the painted image on to the object 120 when rendered from any view.

During rendering from any viewpoint, the attributes are projected from their painted images on their associated paint surfaces on to the object to determine the attribute values of the object at a given point. In an embodiment, attributes may be projected from a paint surface on to an object surface. For example, the painted attribute values 302 in the planar paint surface 150 in FIG. 3 are shown as attribute values 104a and 106a on the paint surface 100 in FIG. 1. These attribute values 104a and 106a are projected using the projection operation of the paint surface 100 on to the object 102 as attribute values 104b and 106b, shown in FIG. 1.

Figure 4:
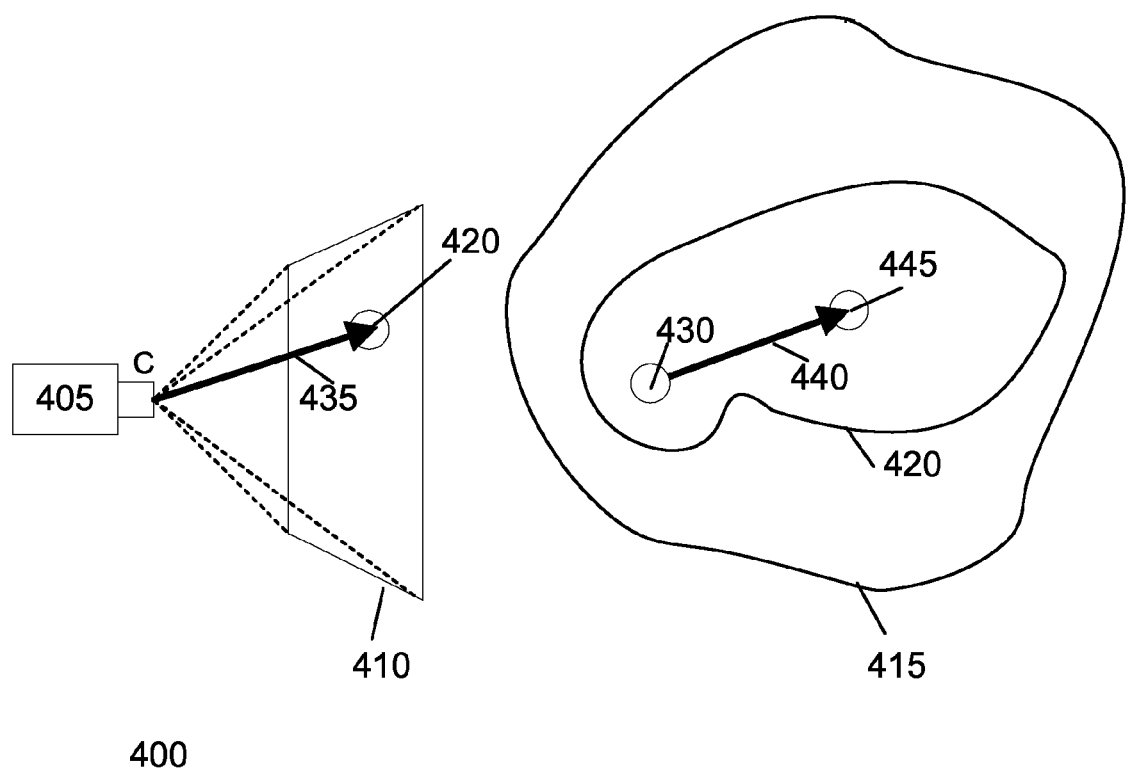
FIG. 4 illustrates an example rendering of an object preview image from the view of a projection paint surface according to an embodiment of the invention.

In further embodiments, attributes may be projected from the paint surface on to other parts or types of objects. For example, attributes may be projected into particle systems, volumetric entities, or on to the surface or the interior of other representations of three-dimensional geometry. Attribute values can be blended, feathered, bled, or otherwise processed using image processing techniques to prevent visible seams and gaps in the attribute values. Depth maps may be used to resolve ambiguities when projecting painted images on non-convex surfaces FIG. 4 illustrates a technique for providing object previews for projection painting operations using arbitrary paint surfaces according to an embodiment of the invention. FIG. 4 illustrates an example scene 400 used to generate object previews for creating attributes as well as for applying the attributes to objects via an arbitrary paint surface. Example scene 400 includes a camera 405 defining a view of the scene. Camera 405 is used to define the resolution and aspect ratio of one or more projection paint attribute images.

Scene 400 also includes a proxy surface 410 located in front of the camera 405. In an embodiment, the proxy surface has a well-defined local coordinate system, such as a two-dimensional surface UV coordinate system. In an embodiment, the proxy surface 410 occupies the entire field of view of the camera 405. In alternate embodiments, the proxy surface 410 may not cover the entire field of view of the camera 405, so as to modify the aspect ratio and resolution of projection paint attribute images.

Scene 400 also includes a projection paint surface 415. Embodiments of the projection paint surface 415 may have any arbitrary topology. In this example scene 400, projection paint surface 415 encloses object 420. In other embodiments, projection paint surface 415 may be partially or entirely enclosed by the object 420.

An embodiment of the invention defines a mapping from the proxy surface 410 to the projection paint surface 415. For every point on the proxy surface 410, an embodiment of this mapping defines a corresponding point on the projection paint surface 415. For example, point 425 on proxy surface 410 corresponds with point 430 on projection paint surface 415.

Object previews allow users and applications to view an image of the object while creating projection paint attributes. For example, if a user want to apply a color highlight along an edge of an object, the object preview allows the user to see the edge of the object in the image editing or paint application and apply the highlight directly over the desired portion of the object. Because the projection paint surface may be an arbitrary surface, the view of the object in the object preview may appear distorted when "flattened" or "unwrapped" in an image editing or paint application. Despite this distortion, the features of the object are usually recognizable. Furthermore, the topology of the projection paint surface 415 and its associated projection operation (discussed in detail below) may be defined to minimize the distortion of the object preview.

To generate an object preview, an embodiment of the invention uses ray tracing or other rendering techniques to define rays such as ray 435 from the camera 405 to the proxy surface 410. An embodiment of the invention determines the intersection point of each of the rays with the proxy surface 410. For example, ray 435 intersects the proxy surface 410 at point 425.

An embodiment of the invention then uses the mapping from the proxy surface 410 to the projection paint surface 415 to determine a point on the projection paint surface 415 corresponding with the intersection point on the proxy surface 410. For example, point 425 on the proxy surface 410 corresponds with point 430 on the projection paint surface 415.

An embodiment of the invention defines a projection operation for the projection paint surface 415. The projection operation specifies, for any point on the projection paint surface 415, a ray direction from the projection paint surface 415 towards the object 420.

The projection operation may be an analytic function or a non-analytic function. All or part of the projection operation may be defined automatically based on analytic properties of the projection paint surface, numerical analysis of the projection paint surface, and/or manually specified. In an embodiment, the projection operation may be specified in a manner such that the associated object or objects are "well-pelted," that is, the three-dimensional geometry of object may split along a defined sequence of edges to form an atlas, or flattened, connected version, of the object surface.

Using the projection operation defined for the projection paint surface 415, an embodiment of the invention generates rays for each point on the projection paint surface 415 corresponding with an intersection point on the proxy surface 410. For example, ray 440 is generated for point 430 on projection paint surface 415.

An embodiment of the invention then determines attribute values for the rays associated with the projection paint surface 415. In one embodiment, the rays associated with the projection paint surface 415 are provided to a renderer to determine the intersections of the rays from the projection paint surface 415 with the object 420. For example, ray 440 intersects object 420 at point 445. The renderer then determines lighting, shading, or other attributes of the object 420 at the intersection point 445.

In other examples, the attribute values of rays may be determined based on the space or volume that it passes through, rather than a discrete intersection point on a surface. Any rendering technique known in the art may be used to determine attribute values for rays, including ray tracing, rasterization, scanline rendering, REYES and micropolygon rendering, and volume rendering techniques.

Regardless of how the renderer determines attribute values for rays, these attributes at point 445 are then mapped back to point 425 on the proxy surface 410. The set of attributes mapped back to proxy surface 410 form an object preview image of object 420.

The object preview image generated using example scene 400 may then be used in an image editing or paint application to define additional projection paint attributes. These projection paint attributes are then mapped from the proxy surface 410 back to the projection paint surface 415 in a similar manner using the same mapping.

During object rendering, an embodiment of the invention processes object geometry to determine portions of the object 420 potentially visible in an image. For each potentially visible portion of the object 420, such as a polygon, micropolygon, fragment, sub-pixel sample, particle, line, flat or curved surface, or other renderable geometric entity, an embodiment of the invention determines one or more projection paint attribute values.

In an embodiment, a renderer or other hardware or software application uses an inverse of the projection operation defined for the projection paint surface to determine projection paint attribute values. In this embodiment, one or more points on the geometric entity are selected. For each of these selected points, an inverse of the projection operation is used to define a ray from this point on the geometry entity towards the projection paint surface 415. The renderer then determines the intersection point of this ray with the projection paint surface and retrieves the projection paint attribute values assigned to this intersection point. If two or more points are selected on a geometric entity, then the projection paint attribute values are blended or combined using a filtering function, such as a filter kernel. The projection paint attribute values are then combined with any other attribute values to determine the final attribute values of the geometric entity.

By using an inverse of the projection operation to determine projection paint attribute values, this embodiment of the invention performs projection paint attribute value filtering directly in the projection paint surface 415, which is independent of the geometric orientation of the parametric space of the surface of the object 420. Filtering attribute values on the projection paint surface 415 provides better visual quality and fewer filtering artifacts.

FIG. 5 illustrates a computer system suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing video data, audio data, or other types of data. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. Disk drive 1800 can include one or more hard disk drives connected to the computer 1200 via an internal connection, such as parallel or serial ATA, or via an external connection, such as iSCSI or other storage area network standards. Disk drive 1800 can use redundancy, such as a RAID subsystem, to improve performance, data integrity, and drive uptime.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of creating a rendered image of an object including attribute values, the method comprising:
   receiving object geometry data;
   defining a projection paint surface and a projection operation specifying ray directions for points on the projection paint surface;
   rendering the object geometry data from the view of the projection paint surface using the projection operation to create an object preview image;
   providing the object preview image to a user;
   receiving projection paint attribute values associated with the object preview image from the user;
   assigning the projection paint attribute values to at least a portion of the points on the projection paint surface; and
   rendering an image including the object geometry data and the projection paint attribute values, comprising:
      selecting a potentially visible geometric entity in the object geometry data;
      selecting a first point in the geometric entity;
      defining a first ray from the first point directed towards the projection paint surface using an inverse of the projection operation;
      determining an intersection of the first ray with a second point on the projection paint surface;
      determining a first projection paint attribute value associated with the second point;
      assigning the first projection paint attribute value to the first point;
      determining a final attribute value of the geometric entity using the first projection paint attribute value of the first point;
      selecting a third point in the geometric entity;
      defining a second ray from the third point directed towards the projection paint surface using the inverse of the projection operation;
      determining an intersection of the second ray with a fourth point on the projection paint surface;
      determining a second projection paint attribute value associated with the fourth point;
      assigning the second projection paint attribute value to the third point; and
      determining the final attribute value of the geometric entity using the second projection paint attribute value of the third point.

2. The method of claim 1, wherein rendering the object geometry data from the view of the projection paint surface comprises:
   defining a camera view and an associated proxy surface;
   defining a mapping between the proxy surface and the projection paint surface, wherein the mapping specifies a correspondence between points on the proxy surface and the points on the projection paint surface;
   determining corresponding points on the projection paint surface for a portion of the points on the proxy surface using the mapping;
   defining rays for the corresponding points on the projection paint surface using the projection operation;
   rendering the object geometry data using the rays to determine attribute values for at least a portion of the rays; and
   creating an object preview image by assigning the attribute values to the points on the proxy surface that correspond with the points on the projection paint surface that are associated with the portion of the rays.

3. The method of claim 2, wherein rendering determines intersection points of at least a portion of the rays with object geometry data.

4. The method of claim 2, wherein the rendering determines attribute values of at least a portion of the rays based on attributes of space traversed by the portion of the rays.

5. The method of claim 1, wherein the projection paint surface includes a non-constant curvature.

6. The method of claim 1, wherein the projection operation includes an analytical function.

7. The method of claim 1, wherein the projection operation includes a non-analytical function.

8. The method of claim 1, wherein the projection operation is defined by a user.

9. The method of claim 1, wherein the object geometry data is well-pelted by the projection operation.

10. A method of creating a rendered image of an object including attribute values, the method comprising:
    receiving object geometry data;
    defining a non-analytical projection paint surface and a projection operation specifying ray directions for points on the projection paint surface;
    receiving projection paint attribute values;
    assigning the projection paint attribute values to at least a portion of the points on the projection paint surface; and
    rendering an image including the object geometry data and the projection paint attribute values, comprising:
       selecting a potentially visible geometric entity in the object geometry data;
       selecting a first point in the geometric entity;

defining a first ray from the first point directed towards the projection paint surface using an inverse of the projection operation;

determining an intersection of the first ray with a second point on the projection paint surface;

determining a first projection paint attribute value associated with the second point;

assigning the first projection paint attribute value to the first point;

determining a final attribute value of the geometric entity using the first projection paint attribute value of the first point;

selecting a third point in the geometric entity;

defining a second ray from the third point directed towards the projection paint surface using the inverse of the projection operation;

determining an intersection of the second ray with a fourth point on the projection paint surface;

determining a second projection paint attribute value associated with the fourth point;

assigning the second projection paint attribute value to the third point; and determining the final attribute value of the geometric entity using the second projection paint attribute value of the third point.

11. The method of claim 10, wherein receiving the projection paint attribute values includes:

rendering the object geometry data from the view of the projection paint surface to create an object preview image;

providing the object preview image to a user; and receiving projection paint attribute values associated with the object preview image from the user.

12. The method of claim 11, wherein rendering the object geometry data comprises:

defining a camera view and an associated proxy surface;

defining a mapping between the proxy surface and the projection paint surface, wherein the mapping specifies a correspondence between points on the proxy surface and the points on the projection paint surface;

determining corresponding points on the projection paint surface for a portion of the points on the proxy surface using the mapping;

defining rays for the corresponding points on the projection paint surface using the projection operation;

rendering the object geometry data using the rays to determine attribute values for at least a portion of the rays; and creating an object preview image by assigning the attribute values to the points on the proxy surface that correspond with the points on the projection paint surface that are associated with the portion of the rays.

13. The method of claim 11, wherein assigning the projection paint attribute values comprises:

for each projection paint attribute value, determining an associated point on a proxy surface;

for each associated point on the proxy surface, determining a corresponding point on the projection paint surface using the mapping; and assigning each projection paint attribute value to its corresponding point on the projection paint surface.

14. The method of claim 10, wherein the projection operation includes an analytical function.

15. The method of claim 10, wherein the projection operation is defined by a user.

16. The method of claim 10, wherein the object geometry data is well-pelted by the projection operation.

* * * * *